US010684851B2

(12) United States Patent
Burli et al.

(10) Patent No.: US 10,684,851 B2
(45) Date of Patent: Jun. 16, 2020

(54) PREDICTING SOFTWARE BUILD OUTCOMES

(71) Applicant: VMWARE, INC., Palo Alto, CA (US)

(72) Inventors: Badarinarayan Parthasarathi Burli, Bangalore (IN); Vikas Pradeep Kumar, Bangalore (IN); Vinay Kumar Amble Vasantha, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/890,385

(22) Filed: Feb. 7, 2018

(65) Prior Publication Data
US 2019/0138300 A1    May 9, 2019

(30) Foreign Application Priority Data

Nov. 3, 2017 (IN) .............................. 201741039291

(51) Int. Cl.
*G06F 9/44* (2018.01)
*G06F 9/45* (2006.01)
*G06F 8/77* (2018.01)
*G06N 7/00* (2006.01)
*G06N 20/00* (2019.01)
(Continued)

(52) U.S. Cl.
CPC .................. *G06F 8/77* (2013.01); *G06F 8/31* (2013.01); *G06F 8/71* (2013.01); *G06N 7/005* (2013.01); *G06N 20/00* (2019.01); *G06F 8/72* (2013.01)

(58) Field of Classification Search
CPC ..... G06F 8/77; G06F 8/31; G06F 8/71; G06F 8/72; G06N 7/005; G06N 99/005; G06N 20/00
See application file for complete search history.

(56) References Cited

U.S. PATENT DOCUMENTS 8,306,849 B2 * 11/2012 Graham ................. G06Q 10/10
                                                   705/7.32
8,843,878 B1 *  9/2014 Grundner ........... G06Q 10/0631
                                                   717/101
(Continued)

OTHER PUBLICATIONS

Andrew Maneely, Predicting Failures with Developer Networks and Social Network Analysis, pp. 1-11, 2008 http://citeseerx.ist.psu.edu/viewdoc/download?doi=10.1.1.467.4637&rep=rep1&type=pdf (Year: 2008).*

(Continued)

*Primary Examiner* — Mongbao Nguyen
(74) *Attorney, Agent, or Firm* — Su IP Consulting

(57) ABSTRACT

Methods are provided for software build outcome prediction. For example, one method may comprise obtaining feature data associated with a software build, the feature data including one or more of the following: first data identifying a user to perform a modification on a set of one or more software artifacts, second data identifying the set of one or more software artifacts, and third data identifying a set of one or more reviewers to review the modification. The method may also comprise determining first probability data associated with the software build being unsuccessful given the feature data and second probability data associated with the software build being successful given the feature data; and predicting a software build outcome associated with the software build based on the first probability data and the second probability data.

21 Claims, 6 Drawing Sheets

(51) Int. Cl.
　　　*G06F 8/71*　　　(2018.01)
　　　*G06F 8/30*　　　(2018.01)
　　　*G06F 8/72*　　　(2018.01)

(56) References Cited

U.S. PATENT DOCUMENTS

| | | | |
|---|---|---|---|
| 9,135,559 B1* | 9/2015 | Chan | G06N 99/005 |
| 9,619,363 B1* | 4/2017 | Chitale | G06F 11/3692 |
| 10,366,346 B2* | 7/2019 | Achin | G06N 20/00 |
| 2010/0179930 A1* | 7/2010 | Teller | G06N 20/00 706/12 |
| 2013/0311968 A1* | 11/2013 | Sharma | G06Q 10/06 717/101 |
| 2014/0053135 A1* | 2/2014 | Bird | G06F 8/71 717/124 |
| 2014/0365990 A1* | 12/2014 | Nakao | G06F 8/71 717/101 |
| 2015/0294246 A1* | 10/2015 | Guven Kaya | G06Q 10/067 705/7.28 |
| 2015/0310332 A1* | 10/2015 | Kupershtok | G06F 11/00 706/12 |
| 2015/0332156 A1* | 11/2015 | Pliner | G06Q 30/00 706/52 |
| 2016/0034270 A1* | 2/2016 | Swierc | G06F 11/3668 717/126 |
| 2016/0110549 A1* | 4/2016 | Schmitt | G06F 21/577 726/25 |
| 2016/0232003 A1* | 8/2016 | Kompella | G06F 8/77 |
| 2016/0335555 A1* | 11/2016 | Llanes-Tosar | G06F 8/70 |
| 2017/0003948 A1* | 1/2017 | Iyer | G06F 8/65 |
| 2017/0034023 A1* | 2/2017 | Nickolov | H04L 43/0817 |
| 2017/0060738 A1* | 3/2017 | Shaharabany | G06F 12/0246 |
| 2017/0185904 A1* | 6/2017 | Padmanabhan | G06F 16/00 |
| 2017/0235569 A1* | 8/2017 | Sturtevant | G06Q 40/12 717/102 |
| 2018/0046926 A1* | 2/2018 | Achin | G06Q 10/06 |
| 2018/0052762 A1* | 2/2018 | Vyas | G06F 11/3668 |
| 2018/0060738 A1* | 3/2018 | Achin | G06Q 10/04 |
| 2018/0074936 A1* | 3/2018 | Broadbent | G06F 11/3604 |
| 2018/0210709 A1* | 7/2018 | Bharthulwar | G06F 8/24 |
| 2018/0276584 A1* | 9/2018 | Woulfe | G06Q 10/0635 |
| 2018/0349135 A1* | 12/2018 | Burns | G06F 8/77 |
| 2018/0349930 A1* | 12/2018 | Blomberg | G06Q 30/0202 |
| 2019/0065979 A1* | 2/2019 | Shao | G06N 7/005 |
| 2019/0138299 A1* | 5/2019 | Ma | G06F 8/77 |
| 2019/0227774 A1* | 7/2019 | Banuelos | G06F 8/33 |

OTHER PUBLICATIONS

Ayse Tosun Misirli, Bayesian Networks for Evidence-Based Decision-Making in Software Engineering, 2014, pp. 533-552. https://ieeexplore.ieee.org/stamp/stamp.jsp?tp=&arnumber=6808495 (Year: 2014).*

Anand Prasad, Estimating and Improving the Probability of Success of a Software Project by Analysing the Factors Involved Using Data Mining, 2010, pp. 391-394. https://ieeexplore.ieee.org/stamp/stamp.jsp?tp=&arnumber=5641159 (Year: 2010).*

Sangita Gupta, Performance Analysis using Bayesian Classification-Case Study of Software Industry, 2014, pp. 19-24. https://pdfs.sennanticscholar.org/484e/d028f3c4f7cb0565d886a3e30678ab329d3b.pdf (Year: 2014).*

Karel Dejaeger, Toward Comprehensible Software Fault Prediction Models Using Bayesian Network Classifiers, 2013, pp. 237-256. https://ieeexplore.ieee.org/stamp/stamp.jsp?tp=&arnumber=6175912 (Year: 2013).*

Peng He, An Empirical Study on Software Defect Prediction with a Simplified Metric Set, 2014, pp. 1-24. https://arxiv.org/pdf/1402.3873.pdf (Year: 2014).*

Andrew Meneely et al., "Predicting Failures with Developer Networks and Social Network Analysis", 11 pages.

Dr Jacqui Finlay et al., "Data stream mining for predicting software build outcomes using source code metrics", Auckland University of Technology, Aukland, New Zealand, 22 pages.

Jacquiline Alannah Finaly, "Multi-Metric prediction of software build outcomes", Thesis Auckland University of Technology, Mar. 1, 2013, 269 pages.

* cited by examiner

PREDICTING SOFTWARE BUILD OUTCOMES

RELATED APPLICATIONS

Benefit is claimed under 35 U.S.C. 119(a)-(d) to Foreign Application Serial No. 201741039291 filed in India entitled "PREDICTING SOFTWARE BUILD OUTCOMES", on Nov. 3, 2017, by VMware, Inc., which is herein incorporated in its entirety by reference for all purposes.

BACKGROUND

Unless otherwise indicated herein, the approaches described in this section are not admitted to be prior art by inclusion in this section.

Software development teams are often required to deliver software releases within a certain time constraint. Using Development Operations (DevOps) or agile methodologies, software releases may be increased through a continuous integration and continuous deployment (CI-CD) design practice. A characteristic of the CI-CD design practice is to maintain the integrity of software builds, which may not be easy to achieve in practice.

DETAILED DESCRIPTION

Figure 1:
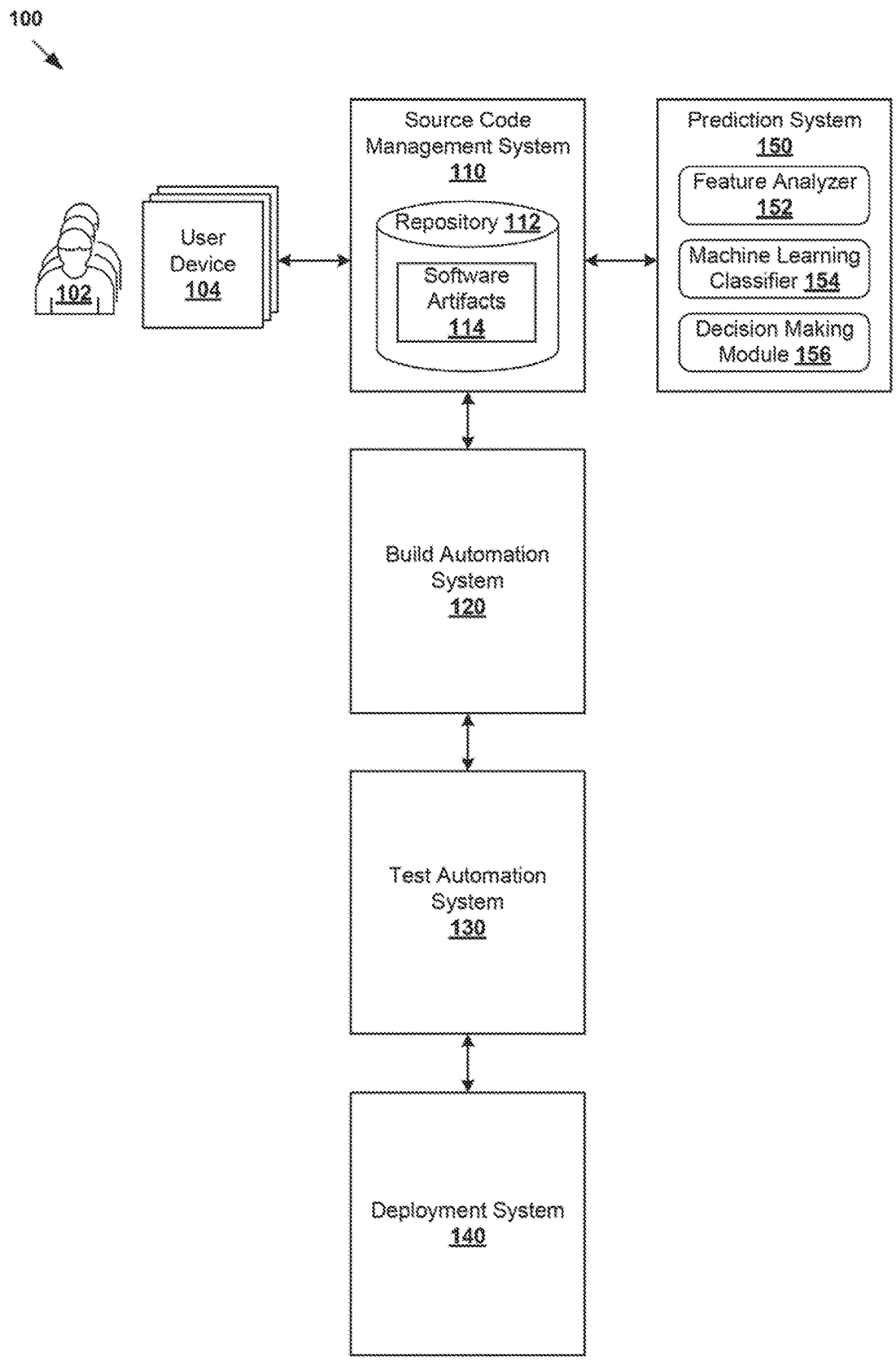
FIG. 1 is a schematic diagram illustrating an example computing environment in which software build outcome prediction may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to software development will now be explained using FIG. 1, which is a schematic diagram illustrating example computing environment 100 in which software build outcome prediction may be performed. It should be understood that, depending on the desired implementation, computing environment 100 may include additional and/or alternative components than that shown in FIG. 1.

In the example in FIG. 1, computing environment 100 includes source code management system 110, build automation system 120, test automation system 130 and deployment system 140 to facilitate software development and delivery. In practice, any software development and delivery process may be used. One example is Development Operations (DevOps), which defines a set of practices that emphasize communication, collaboration and cohesion among traditionally separate development and operations teams. In practice, systems 110-140 may be implemented using one or more physical machine(s) and/or virtualized computing instance(s).

In the example in FIG. 1, source code management system 110 is configured to manage software artifacts 114 stored in repository 112 accessible by users 102 via user devices 104. As used herein, the term "software artifact" may refer generally to an item that is produced during software development, such as source code file(s), configuration files, tools, libraries, etc. Source code management system 110 generally includes a version control tool (not shown for simplicity) to store a complete file and metadata history for each software artifact to the retrieval of a particular version of the software artifact. During a software development phase, users 102 may access (i.e., check out) software artifacts 114 to perform any necessary modification and/or review, before committing (i.e., check in) software artifacts 114 into repository 112.

Build automation system 120 is configured to automate software build. Here, the term "software build" may refer generally to a process for converting the software artifact(s) 114 to executable code data, or a result or output thereof. For example, a software build may involve accessing software artifacts 114 in repository 112, compiling software artifacts 114 into the executable code data and linking objects together to perform intended functions. Example executable code data that can be run on a machine may include such as program libraries, build files, compiled source code files, configuration files, any combination thereof, etc.

Test automation system 130 is configured to automate software testing on software builds produced by build automation system 120. Any suitable tests may be performed (e.g., in a test environment), such as unit testing, integration testing, security testing, application programming interface (API) testing, system testing, performance testing, etc. In practice, for example, integration and system testing may occur in a staging environment before a software product is released into a production environment using deployment system 140.

One of the cornerstones of DevOps is the continuous integration and continuous deployment (CI-CD) design practice. In the field of software engineering, continuous integration (CI) may refer generally the practice of merging all working copies to a shared mainline on a frequent basis (e.g., several times a day) and performing automated testing. Continuous delivery (CD) may refer generally a software engineering approach in which teams produce software in short cycles, to facilitate rapid and reliable software releases.

A characteristic of the CI-CD design practice is to maintain the integrity of software builds. However, in practice, this may not be easily achieved. For example, it is desirable that modifications made to software artifacts 114 will not break the corresponding software build runs. In most cases, the complexity of software artifacts 114 makes it difficult to predict the impact of such modifications before the modifications are performed and a few automated tests are run. In practice, these tests may take several hours (e.g., 1-2 hours). If the software build fails the tests, additional time and effort is required to identify the relevant defects, generate software builds and re-run the tests. These efficiencies are exacerbated when the software product involves the integration of a large number of software artifacts 114.

Predicting Software Build Outcomes

According to examples of the present disclosure, software build outcome prediction may be performed using prediction system 150 ("computer system") to improve software development quality. For example in FIG. 1, prediction system 150 implements machine learning classifier 154 to predict whether a software build will be success or unsuccessful based on feature data associated with the software build. Since software build failures cost additional time and effort, examples of the present disclosure may be implemented to mitigate risks associated with software build failures. Based on the prediction, the impact of any change on software build integrity may be evaluated to facilitate informed, data-driven decision making instead of relying on intuitions and guesses by engineers and managers.

Figure 2:
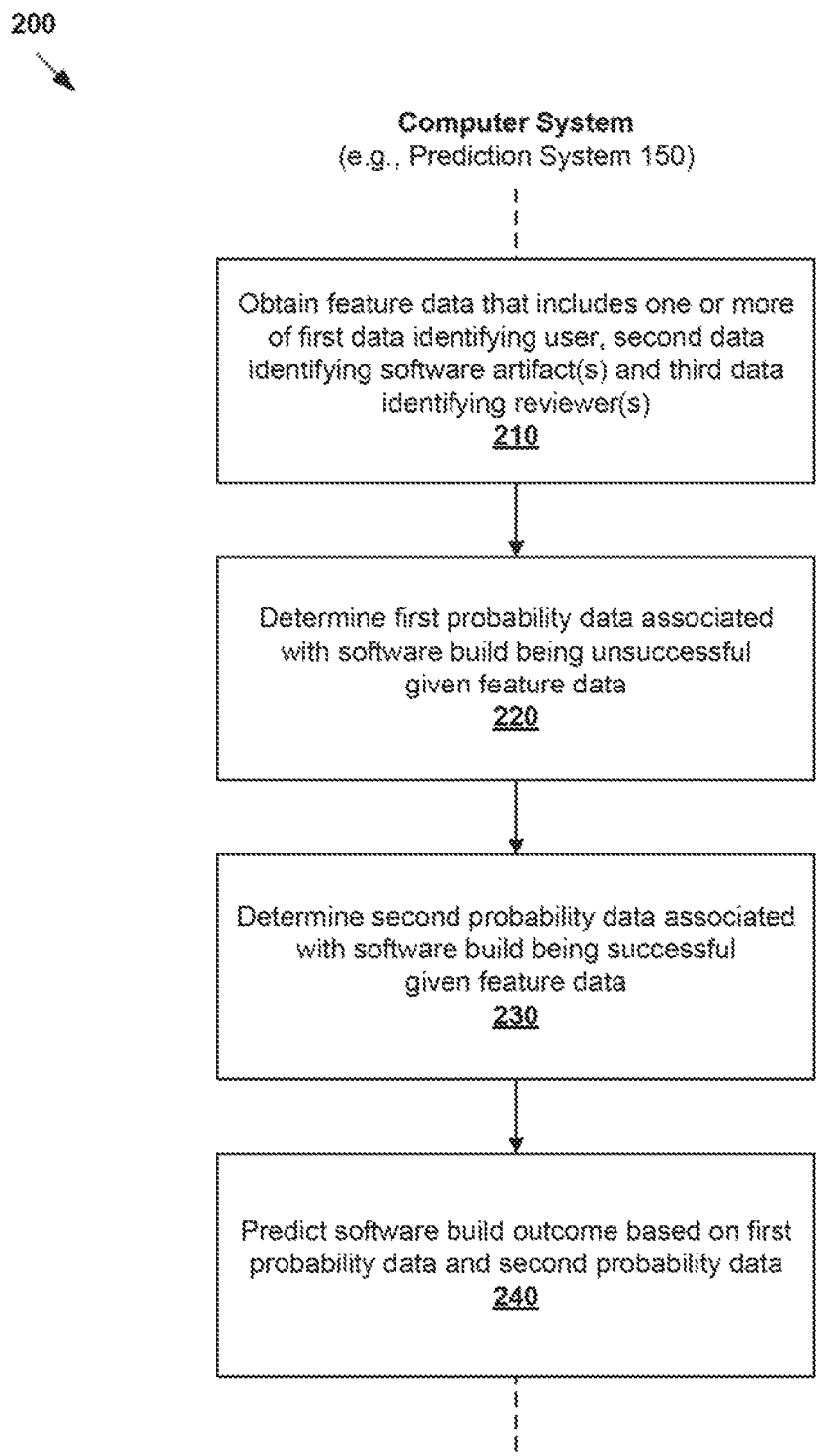
FIG. 2 is a flowchart of an example process for a computer system to perform software build outcome prediction.

In more detail, FIG. 2 is a flowchart of example process 200 for a computer system to perform software build outcome prediction. Example process 200 may include one or more operations, functions, or actions illustrated by one or more blocks, such as 210 to 240. The various blocks may be combined into fewer blocks, divided into additional blocks, and/or eliminated depending on the desired implementation. Example process 200 may be performed by any suitable "computer system," such as prediction system 150 in FIG. 1. Prediction system 150 may implement any suitable component(s), such as feature analyzer 152, machine learning classifier 154, decision making module 156, etc. In practice, prediction system 150 may be implemented using one or more physical and/or virtual machine(s).

At 210 in FIG. 2, feature data associated with the software build is obtained. The feature data may include one or more of the following: first data identifying a user to perform a modification on a set of one or more software artifacts, second data identifying the set of one or more software artifacts, and third data identifying a set of one or more reviewers to review the modification. The feature data is indicative of the modification made, or to be performed, on the set of software artifact(s).

At 220 and 230 in FIG. 2, first probability data and second probability data associated with the software build are determined. The first probability data may be associated with the software build being unsuccessful given the feature data, and the second probability data may be associated with the software build being successful given the feature data. At 240 in FIG. 2, a software build outcome is predicted based on the first probability data and the second probability data. For example, predicting the "software build outcome" may involve assigning a class label $C_k$ (k=1,2) of either $C_1$=FAIL (i.e., unsuccessful) or $C_2$=PASS (i.e., successful) to the software build.

As will be discussed further using FIG. 3 and FIG. 4, the first data, second data and third data associated with the $i^{th}$ software build may be denoted as (Ui, Fi, Ri) respectively. In relation to block 220, the first probability data (also known as first posterior probability data) may be determined based on first conditional probability data that includes one or more of the following: a conditional probability associated with the user given that the software build is unsuccessful (e.g., p(Ui|FAIL) for user Ui), a conditional probability associated with the set of one or more software artifacts given that the software build is unsuccessful (e.g., p(Fi|FAIL) for set Fi), a conditional probability associated with the set of one or more reviewers given that the software build is unsuccessful (e.g., p(Ri|FAIL) for set Ri).

In relation to block 230, the second probability data (also known as second posterior probability data) may be determined based on first conditional probability data that includes one or more of the following: a conditional probability associated with the user given that the software build is successful (e.g., p(Ui|PASS) for user Ui), a conditional probability associated with the set of one or more software artifacts given that the software build is successful (e.g., p(Fi|PASS) for set Fi), a conditional probability associated with the set of one or more reviewers given that the software build is successful (e.g., p(Ri|PASS) for set Ri).

In relation to block 240, the software build outcome may be predicted based on a comparison between the first probability data (e.g., p(FAIL|Ui,Fi,Ri)) and the second probability data (e.g., p(PASS|Ui,Fi,Ri)). For example, in response to determination that the first probability data is greater than the second probability data, software build outcome=unsuccessful (FAIL) may be predicted. In response to determination that the second probability data is greater than the first probability data, software build outcome=successful (PASS) may be predicted. Further, in response to determination that the first probability data is equal to the second probability data, predicting the software build outcome based on a comparison between first prior probability data associated with the software build being successful regardless of the feature data (e.g., p(FAIL)) and second prior probability data associated with the software build being unsuccessful regardless of the feature data (e.g., p(PASS)).

According to examples of the present disclosure, it is not necessary to derive complicated software code metrics from the set of software artifact(s) to perform the software build outcome prediction. Example software code metrics include Halstead metrics that measure software complexity (e.g., number of operands, number of operators, difficulty level, effort to implement, number of delivered bugs, program vocabulary size, etc.), cohesion metrics that measure software reusability and readability (e.g., lack of cohesion indicators, etc.), inheritance metrics that measure software inheritance structure (e.g., depth of inheritance, etc.), etc.

The abovementioned software code metrics generally increase the complexity of the prediction problem. Depending on the complexity of the software code metrics, data mining techniques may be required to derive them. Further, in some cases, the software code metrics cannot be obtained without a relatively high level of access privilege or permission. In contrast, it should be understood that software code metrics are not required in the feature data at block 210, thereby reducing the complexity of the prediction problem. Also, unlike the software code metrics, the first data (Ui), second data (Fi) and third data (Ri) are usually more easily available, such as from source code management system 110 in the example in FIG. 1.

Figure 6:
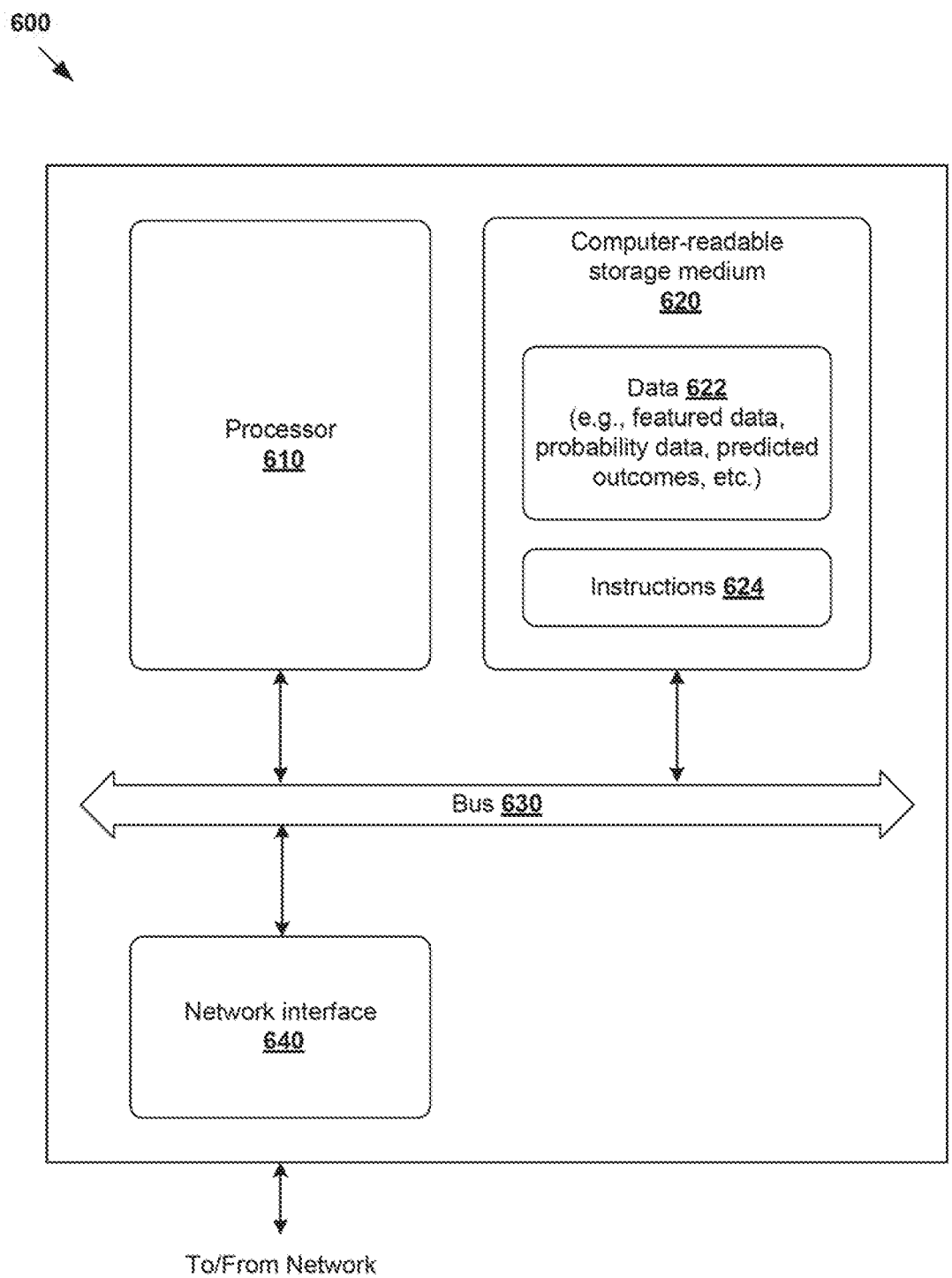
FIG. 6 is a schematic diagram illustrating an example computer system to perform software build outcome prediction.

As will be discussed using FIG. 6, software outcome prediction may be performed to facilitate risk assessment, task assignment, etc. In one example, based on the first conditional probability data and the second conditional probability data, risk assessment may be performed by assigning one or more of the following: a first risk class to a user, a second risk class to a set of one or more software artifacts and a third risk class to a set of one or more reviewers.

In another example, in response to determination that the predicted outcome is successful, the user may be selected to perform the modification and the set of reviewer(s) to review the modification. Otherwise, in response to determination that the predicted outcome is unsuccessful, a different user or a different set of one or more reviewers, or both, may be selected for the set of software artifact(s) to improve the software outcome prediction. In the following, various examples will be discussed using FIG. 3 to FIG. 6.

Prediction System

Figure 3:
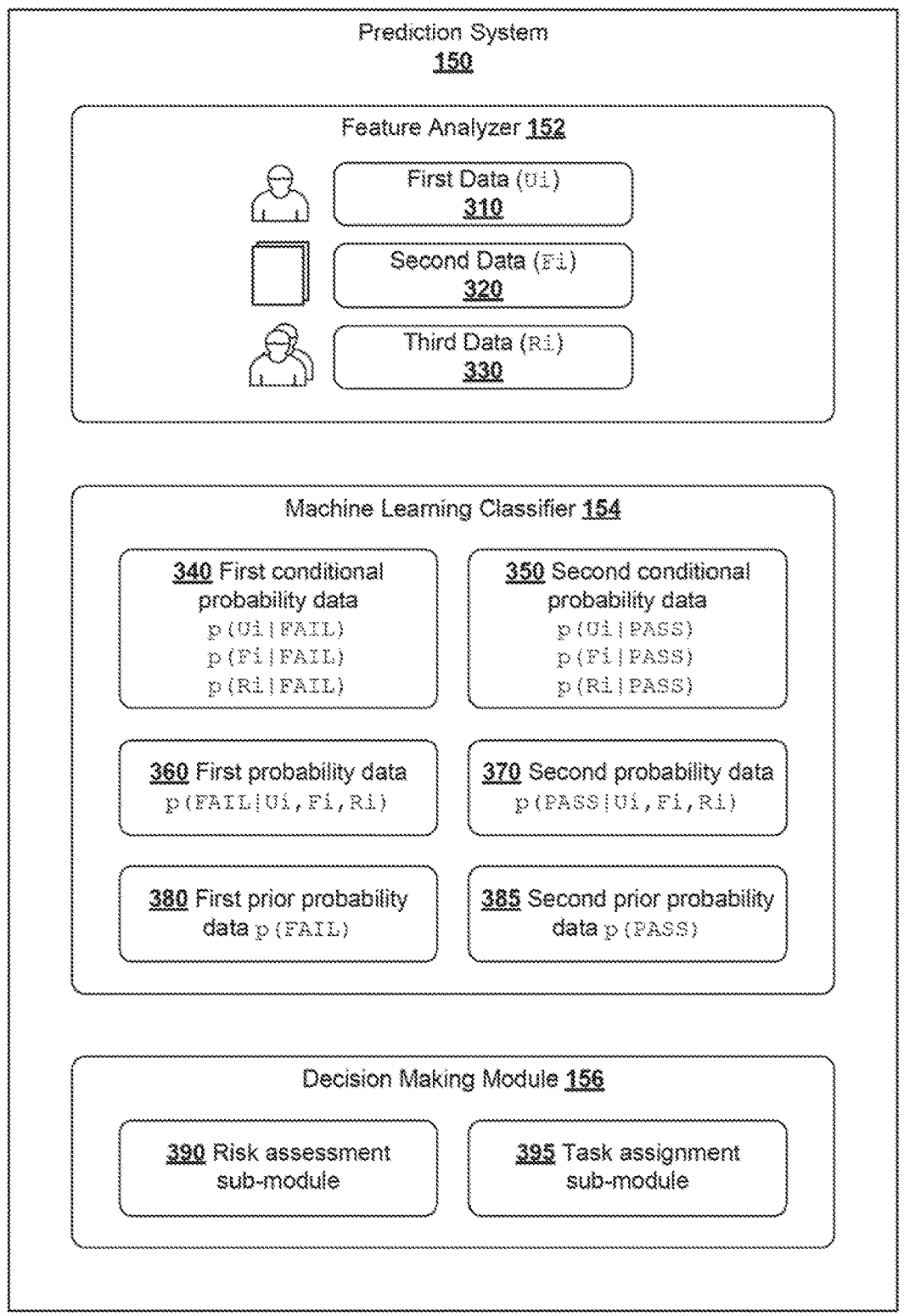
FIG. 3 is a schematic diagram illustrating an example prediction system in the example in FIG. 1.

FIG. 3 is a schematic diagram illustrating example prediction system 150 in the example in FIG. 1. It should be understood that, depending on the desired implementation, example prediction system 150 may include additional and/or alternative components than that shown in FIG. 3. In practice, any suitable machine learning algorithms may be used by machine learning classifier 154, such as Bayesian algorithm (e.g., Naïve Bayes, Gaussian Naïve Bayes, etc.), logistic regression, linear regression, decision tree, support vector machine, kernel estimation (e.g., k-nearest neighbor), neural network, etc. In the following, an example will be explained using a modified Naïve Bayes classifier. It should be understood that any alternative and/or additional machine learning techniques may be used.

In the field of machine learning, Naïve Bayes classifiers are a family of probabilistic classifiers that are based on the Bayes theorem, which describes how the conditional probability of each set of possible causes for a given outcome may be computed from knowledge of the probability of each cause and the conditional probability of the outcome of each cause. In general, given a set of features $X=(X_1, \ldots, X_N)$, the Naïve Bayes classifier assigns a (posterior) probability $p(C_k|X_1, \ldots, X_N)$ for each of K possible outcomes or classes $C_k$.

In relation to software build outcome prediction, machine learning classifier 154 may be configured to assign either a first class label denoted as $C_1$=FAIL (i.e., unsuccessful) or $C_2$=PASS (i.e., successful) to a software build based on feature data associated with the software build. Any suitable features associated with software builds may be used. In the example in FIG. 3, feature analyzer 152 may be used to obtain feature data that includes first data (see 310), second data (see 320) and third data (see 330) associated with the $i^{th}$ software build. The term "obtain" is broadly used to include feature analyzer 152 extracting feature data from any suitable software build data, retrieving feature data from storage, etc. In practice, any combination of first data 310, second data 320 and third data 330 may be included in the feature data.

It should be noted that the $i^{th}$ software build may be a completed software build that has been performed, or a future software build that is being planned. In the former case (i.e., completed software builds), the software build may serve as a training case or test case for machine learning classifier 154 to improve subsequent predictions. This way, machine learning classifier 154 may operate in a self-tuning mode. Each software build is generally associated with a change set from which second data 320 may be derived. A small change set may modify only a few lines of code, while a large change set may modify several source code files. In the latter case (i.e., future software builds), machine learning classifier 154 may be used to determine the predicted outcome for use by decision making system 156 (to be discussed using FIG. 5).

First data 310 identifies a user (Ui) to perform modification(s) to a set of software artifact(s), such as source code files, etc. Any suitable modification may be performed, such as addition, deletion or editing of source code line(s) and/or software artifact(s). Second data 320 identifies Fi, which represents the set of software artifact(s). Third data 330 identifies Ri, which represents a set of reviewer(s) to review the modification performed, or to be performed, by the user. In an example scenario of 50 possible users, 100 possible software artifact sets and 20 possible reviewer sets, feature data (Ui, Fi, Ri) may be expressed as Ui ∈ {User 1, ..., User 50}, Fi ∈ {File Set 1, ..., File Set 100} and Ri ∈ {Reviewer Set 1, ..., Reviewer Set 20}. Each Fi may include one or more software artifact(s). Similarly, each Ri may include one or more reviewers.

Given feature data (Ui,Fi,Ri) associated with the $i^{th}$ software build, machine learning classifier 154 determines (posterior) probability data associated with two K=2 possible hypotheses or outcomes: $C_1$=FAIL (i.e., software build is unsuccessful) for k=1 and $C_2$=PASS (i.e., software build is successful) for k=2, as follows:

$$p(C_1 = \text{FAIL} | Ui, Fi, Ri) = \frac{p(\text{FAIL})p(Ui, Fi, Ri)}{p(Ui, Fi, Ri)} \quad (1)$$

$$p(C_2 = \text{PASS} | Ui, Fi, Ri) = \frac{p(\text{PASS})p(Ui, Fi, Ri)}{p(Ui, Fi, Ri)} \quad (2)$$

In practice, various approximations may be made to equations (1) and (2). For example, each feature may be assumed to be "conditionally independent" of every other feature for a given outcome $C_k$. In a first example, conditional independence is assumed among (Ui,Fi,Ri), in which case p(Ui|Fi, Ri, FAIL)=p(Ui|FAIL), p(Ui|Fi, Ri, PASS)=p(Ui|PASS), p(Fi|Ui, Ri, FAIL)=p(Fi|FAIL), p(Fi|Ui, Ri, PASS)=p(Fi|PASS), p(Ri|Ui, Fi, FAIL)=p(Ri|FAIL) and p(Ri|Ui, Fi, PASS)=p(Ri|PASS).

In another example, p(Ui, Fi, Ri) in both denominators may be ignored because it does not depend on a given outcome $C_k$ (known as naïve conditional independence). Further, p(FAIL) and p(PASS) in the respective numerators may be ignored, such as based on empirical evidence to improve prediction accuracy. This should be contrasted against conventional (i.e., pure-form) Naïve Bayes classifiers that retain p(FAIL) and p(PASS) in the above equations. Applying the Bayes theorem, equations (1) and (2) may be approximated using equations (3) and (4) below, respectively.

$$p(C_1=\text{FAIL}|Ui,Fi,Ri) \approx p(Ui|\text{FAIL})p(Fi|\text{FAIL})p(Ri|\text{FAIL}) \quad (3)$$

$$p(C_2=\text{PASS}|Ui,Fi,Ri) \approx p(Ui|\text{PASS})p(Fi|\text{PASS})p(Ri|\text{PASS}) \quad (4)$$

In the example in FIG. 3, "first conditional probability data" (see 340) may include p(Ui|FAIL), p(Fi|FAIL) and p(Ri|FAIL). In particular, p(Ui|FAIL) represents a conditional probability associated with user Ui given that the software build is unsuccessful, p(Fi|FAIL) represents a conditional probability associated with Fi given that the software build is unsuccessful and p(Ri|FAIL) represents a conditional probability associated with Ri given that the software build is unsuccessful. "Second conditional probability data" (see 350) may include p(Ui|PASS), p(Fi|PASS) and p(Ri|PASS), where p(Ui|PASS) represents a conditional probability associated with user Ui, p(Fi|FAIL) represents a conditional probability associated with Fi and p(Ri|FAIL) represents a conditional probability associated with Ri given that the software build is successful.

"First probability data" (see 360) refers to p($C_1$=FAIL|Ui, Fi,Ri), while "second probability data" (see 370) to p($C_2$=PASS|Ui,Fi,Ri). Using a maximum a posteriori (MAP) decision rule, the predicted outcome may be determined by comparing p($C_1$=FAIL|Ui,Fi,Ri) and p($C_2$=PASS|Ui, Fi, Ri) to identify the most probable hypothesis. The predicted outcome is $C_1$=FAIL in response to determination that p($C_1$=FAIL|Ui,Fi,Ri)>p($C_2$=PASS|Ui,Fi, Ri). Otherwise, in response to determination that p($C_2$=PASS|Ui,Fi,Ri)>p($C_1$=FAIL|Ui,Fi,Ri), the predicted outcome is $C_2$=PASS.

As will be described further using FIG. 4, the predicted outcome may be determined by comparing p(FAIL) and p(PASS) in the case of p($C_1$=FAIL|Ui,Fi,Ri)=p($C_2$=PASS|Ui,Fi,Ri). "First prior probability data" (see 380) refers to p(FAIL), which is the prior probability of the software build being successful regardless of the feature data. "Second prior probability data" (see 385) refers to p(PASS), which is the prior probability of the software build being unsuccessful regardless of the feature data.

Software Build Outcome Prediction

Figure 4:
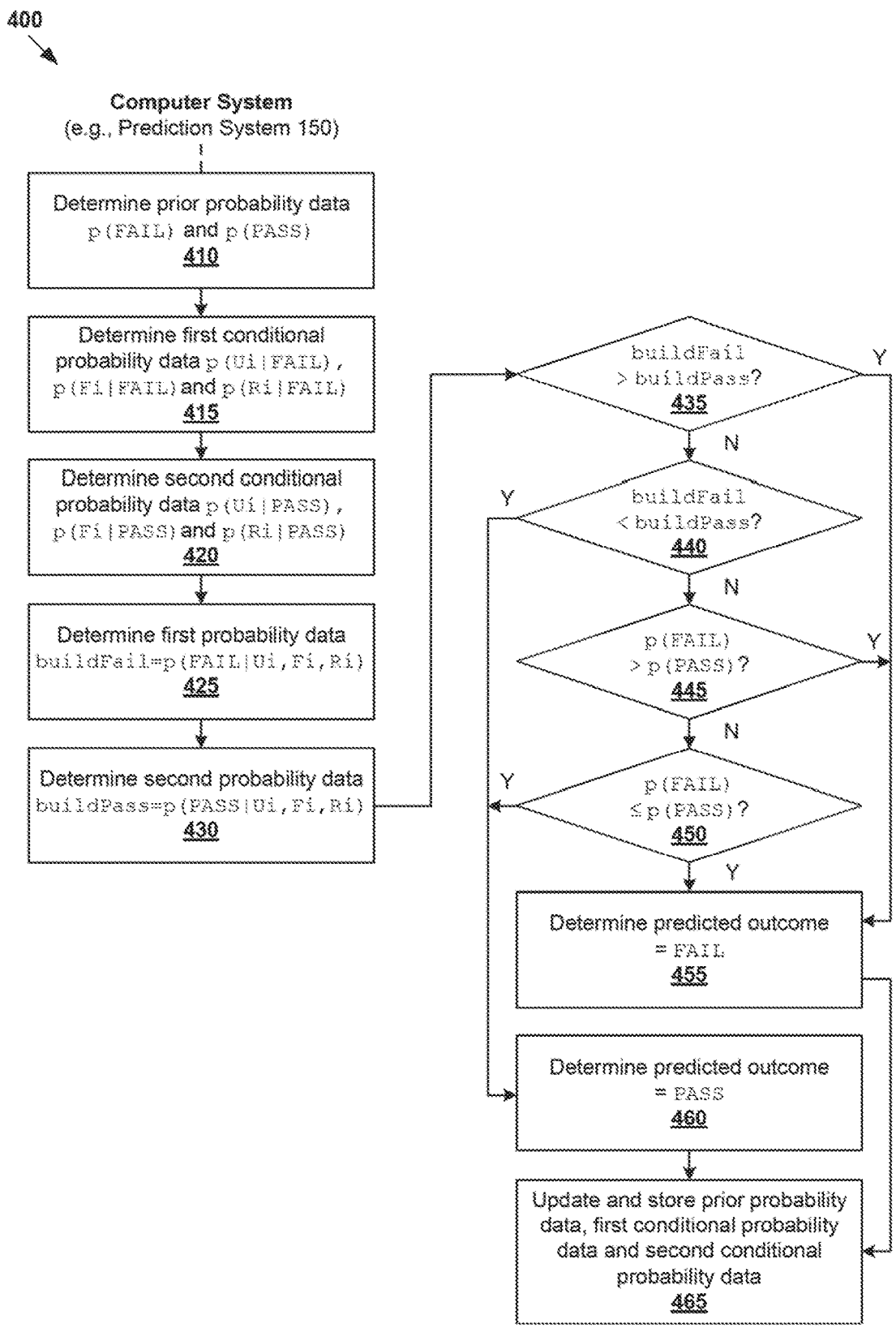
FIG. 4 is a flowchart of an example detailed process for a computer system to perform software build outcome prediction.

FIG. 4 is a flowchart of example detailed process 400 for a computer system to perform software build outcome prediction. Example process 400 may include one or more operations, functions, or actions illustrated by one or more blocks, such as 410 to 465. The various blocks may be combined into fewer blocks, divided into additional blocks, and/or eliminated depending on the desired implementation. Example process 400 may be implemented by prediction system 150, such as using feature analyzer 152 and machine learning classifier 154.

At 410 in FIG. 4, prior probability data 380, 385 are determined. Depending on the desired implementation, p(FAIL) and p(PASS) may be initialized to a predetermined value (e.g., 0.5) at the first iteration. Where applicable, empirical evidence may be used to set their initial value. One factor that influences their value would involve studying distributions of existing software build runs. For example, in some cases, positive values may be used if the overall inclination of build runs is positive, but otherwise negative. After each iteration, p(FAIL) and p(PASS) are updated based on the latest software build run.

At 415 and 420 in FIG. 4, first conditional probability data 340 and second conditional probability data 350 are determined. As explained using FIG. 3, p(Ui|FAIL), p(Fi|FAIL) and p(Ri|FAIL) denote the respective (negative) conditional probabilities associated with Ui, Fi and Ri given that the software build is unsuccessful. Further, p(Ui|PASS), p(Fi|PASS) and p(Ri|PASS) denote the respective (positive) conditional probabilities associated with Ui, Fi and Ri given that the software build is successful.

At 425 and 430 in FIG. 4, first probability data 360 and second probability data 370 are determined using equations (3) and (4) respectively. The two hypotheses buildFail=p(FAIL|Ui,Fi,Ri) and buildPass=p(PASS|Ui,Fi,Ri) are then tested or compared as follows. In particular, at 435 and 455, in response to determination that buildFail is greater than buildPass, the predicted outcome is determined to be $C_1$=FAIL. At 440 and 460, in response to determination buildPass is greater than buildFail, the predicted outcome is determined to be $C_2$=PASS.

At 445 and 455 in FIG. 4, in response to determination that buildFail is equal to buildPass and totalFail is greater than totalPass (i.e., higher prior probability of software build failure), the predicted outcome is determined to be $C_1$=FAIL. Otherwise, at 450 and 460, in response to determination buildFail is equal to buildPass and totalFail is lower than or equal to totalPass (i.e., higher prior probability of software build success), the predicted outcome is determined to be $C_2$ =PASS.

At 465 in FIG. 4, first conditional probability data 340 and second conditional probability data 350 associated with Ui, Fi and Ri, as well as prior probability data 380-385 are updated after each iteration to improve subsequent predictions. For example, p(Ui|FAIL) and p(Ui|PASS) may be calculated as follows, where the total number of cases is denoted as Total:

$$\text{Predicted outcome=FAIL}: p(Ui|\text{FAIL})=[p(Ui|\text{FAIL})+1]/[\text{Total}+1] \quad (5)$$

$$\text{Predicted outcome=FAIL}: p(Ui|\text{PASS})=[p(Ui|\text{PASS})+0]/[\text{Total}+1] \quad (6)$$

$$\text{Predicted outcome=PASS}: p(Ui|\text{FAIL})=[p(Ui|\text{FAIL})+0]/[\text{Total}+1] \quad (7)$$

$$\text{Predicted outcome=PASS}: p(Ui|\text{PASS})=[p(Ui|\text{PASS})+1]/[\text{Total}+1] \quad (8)$$

In practice, any suitable data structure (e.g., multi-dimensional matrix or matrices) may be used to store the prior and conditional probability data. For example in FIG. 3, assuming Ui ∈ {User 1, . . . , User50}, Fi ∈ {File Set 1, . . . , File Set 100} and Ri ∈ {Reviewer Set 1, . . . , Reviewer Set 20}, one data structure may be used to store p(Ui|FAIL), p(Fi|FAIL) and p(Ri|FAIL) for each combination of (Ui, Fi, Ri). Another data structure may be used to store p(Ui|PASS), p(Fi|PASS) and p(Ri|PASS) for each combination of (Ui, Fi, Ri).

Automated Decision Making

Based on a predicted outcome of either FAIL or PASS, decision making module 156 implemented by prediction system 150 may be configured to perform automated decision making. This facilitates informed, data-driven decisions relating to software development planning. Based on the prediction, the impact of any change on software build integrity may be evaluated to improve software development quality.

Some examples will be discussed below using FIG. 5, which is a flowchart of example process 500 for computer system 150 to perform decision making based on software build outcome prediction. Example process 500 may include one or more operations, functions, or actions illustrated by one or more blocks, such as 510 to 555. The various blocks may be combined into fewer blocks, divided into additional blocks, and/or eliminated depending on the desired implementation. For example, blocks 510-525 may be performed using risk assessment sub-module 390 and blocks 530-555 using task assignment sub-module 395.

(a) Risk Assessment

Figure 5:
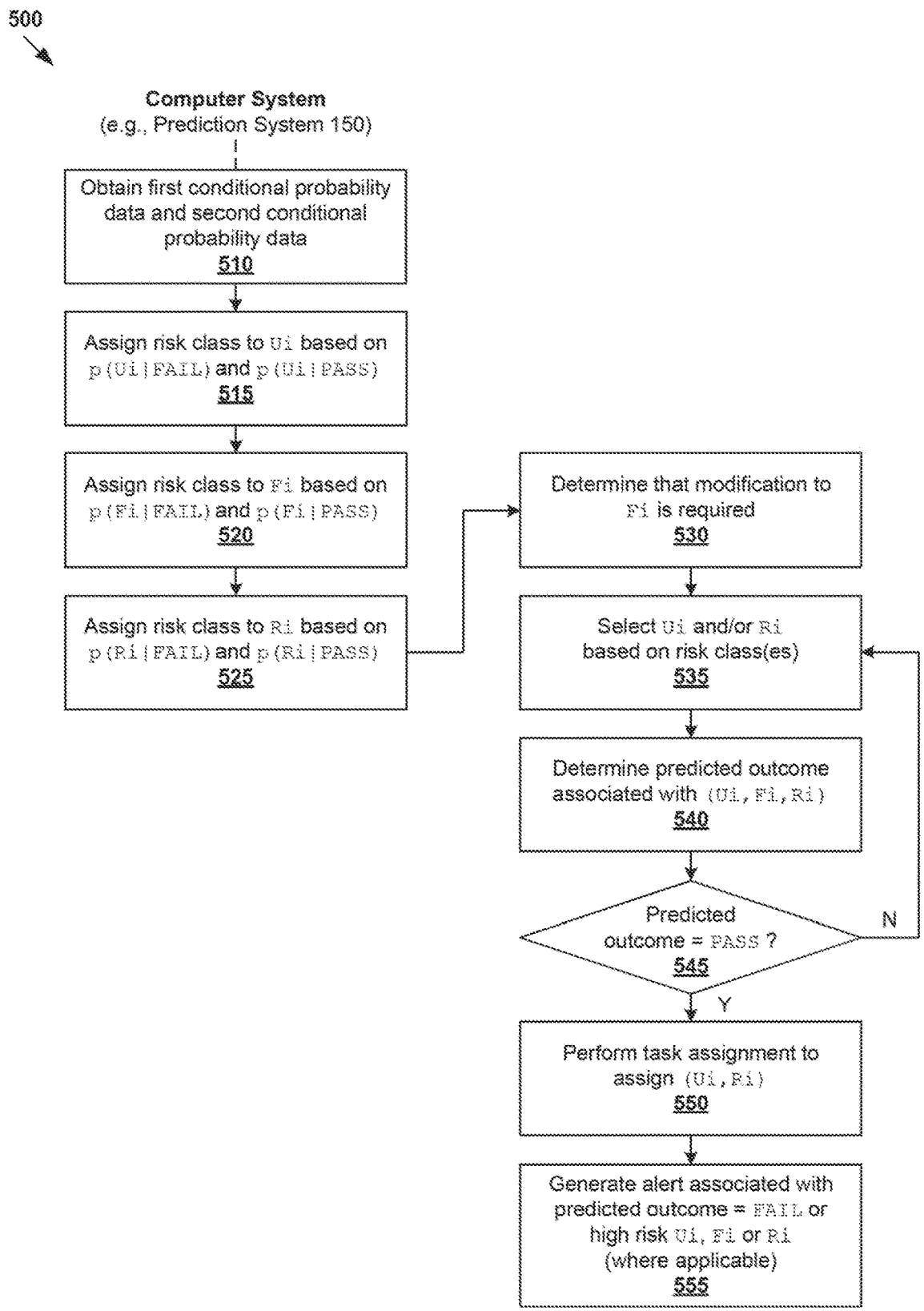
FIG. 5 is a flowchart of an example detailed process for a computer system to perform decision making based on software build outcome prediction.

At 510 to 525 in FIG. 5, first conditional probability data 340 and second conditional probability data 350 are obtained and analyzed to perform risk assessment. In particular, at 515 in FIG. 5, a risk class may be assigned to each user Ui ∈ {User 1, . . . , User 50} based on p(Ui|FAIL) and p(Ui|PASS). At 520 in FIG. 5, a risk class is assigned to each set of software artifact(s) Fi ∈ {File Set 1, . . . , File Set 100} based on p(Fi|FAIL) and p(Fi|PASS). At 525 in FIG. 5, a risk class is assigned to each reviewer Ri ∈ {Reviewer Set 1, . . . , Reviewer Set 20} based on p(Ri|FAIL) and p(Ri|PASS). For example, the assigned risk class may be one of the following: low risk, medium risk and high risk. Depending on the desired implementation, any suitable probability thresholds (see $T_1$ to $T_6$ below) may be used during risk assessment.

For example, in relation Ui at 515, to risk class="low" may be assigned in response to determination that $p(Ui|PASS)>T_1$ and $p(Ui|FAIL) \leq T_2$, where $T_1$ is a first probability threshold and $T_2$ is a second probability threshold. In another example, risk class=high risk may be assigned to Ui in response to determination that $p(Ui|PASS) \leq T_1$ and $p(Ui|FAIL)>T_2$. Otherwise, risk class ="medium" is assigned. See example equation below.

$$\text{risk}(U_i) = \begin{cases} \text{low,} & p(Ui|PASS) > T_1 \text{ and } p(Ui|FAIL) \leq T_2 \\ \text{high,} & p(Ui|PASS) \leq T_1 \text{ and } p(Ui|FAIL) > T_2 \\ \text{med,} & p(Ui|PASS) > T_1 \text{ and } p(Ui|FAIL) > T_2 \end{cases}$$

Similarly, in relation Fi at 520, risk class="low" may be assigned in response to determination that $p(Fi|PASS)>T_3$ and $p(Fi|FAIL) \leq T_4$, where $T_3$ is a third probability threshold and $T_4$ is a fourth probability threshold. Risk class="high" may be assigned to Fi in response to determination that $p(Fi|PASS) \leq T_3$ and $p(Fi|FAIL)>T_4$. Otherwise, risk class="medium" is assigned. See example equation below.

$$\text{risk}(F_i) = \begin{cases} \text{low,} & p(Fi|PASS) > T_3 \text{ and } p(Fi|FAIL) \leq T_4 \\ \text{high,} & p(Fi|PASS) \leq T_3 \text{ and } p(Fi|FAIL) > T_4 \\ \text{med,} & p(Fi|PASS) > T_3 \text{ and } p(Fi|FAIL) > T_4 \end{cases}$$

Further, in relation Ri at 525, risk class="low" may be assigned in response to determination that $p(Ri|PASS)>T_5$, and $p(Ri|FAIL) \leq T_6$, where $T_5$ is a fifth probability threshold and $T_6$ is a sixth probability threshold. Risk class="high" may be assigned to Ri in response to determination that $p(Ri|PASS) \leq T_5$ and $p(Ri|FAIL)>T_6$. Otherwise, risk class="medium" is assigned. See example equation below.

$$\text{risk}(R_i) = \begin{cases} \text{low,} & p(Ri|PASS) > T_5 \text{ and } p(Ri|FAIL) \leq T_6 \\ \text{high,} & p(Ri|PASS) \leq T_5 \text{ and } p(Ri|FAIL) > T_6 \\ \text{med,} & p(Ri|PASS) > T_5 \text{ and } p(Ri|FAIL) > T_6 \end{cases}$$

(b) Task Assignment

When planning a particular software upgrade, prediction system 150 may be used to improve or optimize the predicted outcome. For example, the task of modifying specific software feature(s) may be assigned to a particular user based on the user's pass rate of working on certain software artifact(s) compared to other users. The task of reviewing a specific modification may be assigned to a particular reviewer based on the reviewer's pass rate of working on certain software artifact(s) compared to other reviewers. These tasks may be performed manually (e.g., by a manager or any other decision maker), or automatically using prediction system 150 as follows.

At 530 and 535 in FIG. 5, in response to determination that a set of software artifact(s) Fi that requires modification during a software upgrade, a user and/or reviewer is selected for the software upgrade. The selection may be made based on the risk assessment results at blocks 515-525. For example, in response to determination that Fi is associated with risk class=high, a user Ui associated with risk class=low and/or a reviewer Ri associated with risk class=low may be selected. In another example, At 540 in FIG. 5, a predicted outcome is determined based on (Ui, Fi, Ri) using machine learning classifier 154 according to the examples in FIG. 3 and FIG. 4. At 545 in FIG. 5, in response to determination that the predicted outcome=PASS, task assignment may be performed to assign a modification task to the selected Ui and a review task to the selected Ri. Otherwise, if the predicted outcome=FAIL, a different user Uj and/or a different reviewer Rj may be selected to improve the predicted outcome. Although not shown in FIG. 5, blocks 535-540 may be repeated for a predetermined number of times even when the predicted outcome remains to be FAIL.

At 555 in FIG. 5, a notification or alert may be generated based on a predicted outcome=FAIL and/or in response to determination that a particular software upgrade involves a high risk Ui, Fi or Ri. For example, in practice, based on predicted outcome =FAIL of a last-minute modification by a particular Ui, the alert may be generated to enforce a stricter review process to improve software quality.

Classifier Performance

According to examples of the present disclosure, machine learning classifier 154 (i.e., modified Naïve Bayes Classifier) may be used to perform software build outcome prediction. In general, machine learning classifier 154 is generally simple to implement based on feature data (Ui, Fi, Ri) that is easily available. Based on experimental observations, machine learning classifier 154 generally performs well even in the case of small, or no data.

In practice, the performance of machine learning classifier 154 may be improved using a number of techniques. For example, if software build failures follow a particular probability distribution such as the Gaussian distribution, Gaussian Naïve Bayes classification techniques may be used. Additionally, instead of assuming a particular initial value (e.g., 0.5), prior probability data 380, 385 may be derived empirical software build data to improve prediction hit rate.

According to examples of the present disclosure, "custom weights" may be generated for each of the features involved. For example, each user, each set of software artifact(s) and each set of reviewer(s) may be associated with respective positive weights that affect the estimation of p(FAIL|Ui,Fi, Ri), and respective negative weights that affect the estimation of p(PASS|Ui, Fi, Ri). These weights may be considered as scores for fine-tuning productivity.

Computer System

The above examples can be implemented by hardware (including hardware logic circuitry), software or firmware or a combination thereof. FIG. 6 is a schematic diagram illustrating example computer system 600 to perform software build outcome prediction. Example computer system 600 may include processor 610, computer-readable storage medium 620, network interface 640, and bus 630 that facilitates communication among these illustrated components and other components.

Processor 610 is to perform processes described herein with reference to the drawings. Computer-readable storage medium 620 may store any suitable data 622, such as feature data, probability data, prediction outcomes, etc. Computer-readable storage medium 620 may further store computer-readable instructions 624 ("program code") that, in response to execution by processor 610, cause processor 610 to perform processes described herein with reference to FIG. 1 to FIG. 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one skilled in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

The invention claimed is:

1. A method for a computer system to perform software build outcome prediction, wherein the computer system implements a machine learning classifier and the method comprises:
   obtaining feature data associated with a software build, wherein the feature data includes one or more of the following: first data identifying a user to perform a modification on a set of one or more software artifacts, second data identifying the set of one or more software artifacts, and third data identifying a set of one or more reviewers to review the modification, and wherein each of the first data, the second data, and the third data are conditionally independent of one another for the software build being successful or unsuccessful;
   determining, using the machine learning classifier, first probability data associated with the software build being unsuccessful given the feature data and second probability data associated with the software build being successful given the feature data, wherein the first probability data and the second probability data are conditional independent from each other;
   comparing the first probability data and the second probability to obtain a comparison result; and
   predicting, using the machine learning classifier, a software build outcome associated with the software build based on the comparison result.

2. The method of claim 1, wherein predicting the software build outcome comprises:
   in response to the comparison result that the first probability data is greater than the second probability data, predicting the software build outcome to be unsuccessful; and
   in response to the comparison result that the second probability data is greater than the first probability data, predicting the software build outcome to be successful.

3. The method of claim 2, wherein predicting the software build outcome comprises:
   in response to the comparison result that the first probability data is equal to the second probability data, predicting the software build outcome based on a comparison between first prior probability data associated with the software build being successful regardless of the feature data and second prior probability data associated with the software build being unsuccessful regardless of the feature data.

4. The method of claim 1, wherein determining the first probability data comprises:
   determining the first probability data based on first conditional probability data that includes one or more of the following: a conditional probability associated with the user given that the software build is unsuccessful, a conditional probability associated with the set of one or more software artifacts given that the software build is unsuccessful, a conditional probability associated with the set of one or more reviewers given that the software build is unsuccessful.

5. The method of claim 4, wherein determining the second probability data comprises:
   determining the second probability data based on second conditional probability data that includes one or more of the following: a conditional probability associated with the user given that the software build is successful, a conditional probability associated with the set of one or more software artifacts given that the software build is successful, a conditional probability associated with the set of one or more reviewers given that the software build is successful.

6. The method of claim 5, wherein the method further comprises: based on the first conditional probability data and the second conditional probability data, performing risk assessment by assigning one or more of the following: a first risk class to the user, a second risk class to the set of one or more software artifacts and a third risk class to the set of one or more reviewers.

7. The method of claim 1, wherein the method further comprises:
   in response to determination that the predicted software build outcome is successful, assigning the user to perform the modification and the set of one or more reviewers to review the modification; and in response to determination that the predicted software build outcome is unsuccessful, selecting a different user or a different set of one or more reviewers, or both, for the set of one or more software artifacts to improve the predicted software build outcome.

8. A non-transitory computer-readable storage medium that includes a set of instructions which, in response to execution by a processor of a computer system, cause the processor to perform software build outcome prediction, wherein the computer system implements a machine learning classifier and the method comprises:
obtaining feature data associated with a software build, wherein the feature data includes one or more of the following: first data identifying a user to perform a modification on a set of one or more software artifacts, second data identifying the set of one or more software artifacts, and third data identifying a set of one or more reviewers to review the modification, and wherein each of the first data, the second data, and the third data are conditionally independent of one another for the software build being successful or unsuccessful;
determining, using the machine learning classifier, first probability data associated with the software build being unsuccessful given the feature data and second probability data associated with the software build being successful given the feature data, wherein the first probability data and the second probability data are conditional independent from each other;
comparing the first probability data and the second probability to obtain a comparison result; and
predicting, using the machine learning classifier, a software build outcome associated with the software build based on the comparison result.

9. The non-transitory computer-readable storage medium of claim 8, wherein predicting the software build outcome comprises:
in response to the comparison result that the first probability data is greater than the second probability data, predicting the software build outcome to be unsuccessful; and
in response to the comparison result that the second probability data is greater than the first probability data, predicting the software build outcome to be successful.

10. The non-transitory computer-readable storage medium of claim 9, wherein predicting the software build outcome comprises:
in response to the comparison result that the first probability data is equal to the second probability data, predicting the software build outcome based on a comparison between first prior probability data associated with the software build being successful regardless of the feature data and second prior probability data associated with the software build being unsuccessful regardless of the feature data.

11. The non-transitory computer-readable storage medium of claim 8, wherein determining the first probability data comprises:
determining the first probability data based on first conditional probability data that includes one or more of the following: a conditional probability associated with the user given that the software build is unsuccessful, a conditional probability associated with the set of one or more software artifacts given that the software build is unsuccessful, a conditional probability associated with the set of one or more reviewers given that the software build is unsuccessful.

12. The non-transitory computer-readable storage medium of claim 11, wherein determining the second probability data comprises:
determining the second probability data based on second conditional probability data that includes one or more of the following: a conditional probability associated with the user given that the software build is successful, a conditional probability associated with the set of one or more software artifacts given that the software build is successful, a conditional probability associated with the set of one or more reviewers given that the software build is successful.

13. The non-transitory computer-readable storage medium of claim 12, wherein the method further comprises:
based on the first conditional probability data and the second conditional probability data, performing risk assessment by assigning one or more of the following: a first risk class to the user, a second risk class to the set of one or more software artifacts and a third risk class to the set of one or more reviewers.

14. The non-transitory computer-readable storage medium of claim 8, wherein the method further comprises:
in response to determination that the predicted software build outcome is successful, assigning the user to perform the modification and the set of one or more reviewers to review the modification; and in response to determination that the predicted software build outcome is unsuccessful, selecting a different user or a different set of one or more reviewers, or both, for the set of one or more software artifacts to improve the predicted software build outcome.

15. A computer system, comprising:
a processor; and
a non-transitory computer-readable medium having stored thereon instructions that, when executed by the processor, cause the processor to:
obtain feature data associated with a software build, wherein the feature data includes one or more of the following: first data identifying a user to perform a modification on a set of one or more software artifacts, second data identifying the set of one or more software artifacts, and third data identifying a set of one or more reviewers to review the modification, and wherein each of the first data, the second data, and the third data are conditionally independent of one another for the software build being successful or unsuccessful;
determine, using a machine learning classifier, first probability data associated with the software build being unsuccessful given the feature data and second probability data associated with the software build being successful given the feature data, wherein the first probability data and the second probability data are conditional independent from each other;
compare the first probability data and the second probability data to obtain a comparison result; and
predicting, using the machine learning classifier, a software build outcome associated with the software build based on the comparison result.

16. The computer system of claim 15, wherein the instructions for predicting the software build outcome cause the processor to:
in response to the comparison result that the first probability data is greater than the second probability data, predict the software build outcome to be unsuccessful; and
in response to the comparison result that the second probability data is greater than the first probability data, predict the software build outcome to be successful.

17. The computer system of claim 16, wherein the instructions for predicting the software build outcome cause the processor to:
in response to the comparison result that the first probability data is equal to the second probability data, predict the software build outcome based on a comparison between first prior probability data associated with the software build being successful regardless of the feature data and second prior probability data associated with the software build being unsuccessful regardless of the feature data.

18. The computer system of claim 15, wherein the instructions for determining the first probability data cause the processor to:
determine the first probability data based on first conditional probability data that includes one or more of the following: a conditional probability associated with the user given that the software build is unsuccessful, a conditional probability associated with the set of one or more software artifacts given that the software build is unsuccessful, a conditional probability associated with the set of one or more reviewers given that the software build is unsuccessful.

19. The computer system of claim 18, wherein the instructions for determining the second probability data cause the processor to:
determine the second probability data based on second conditional probability data that includes one or more of the following: a conditional probability associated with the user given that the software build is successful, a conditional probability associated with the set of one or more software artifacts given that the software build is successful, a conditional probability associated with the set of one or more reviewers given that the software build is successful.

20. The computer system of claim 19, wherein the instructions further cause the processor to:
based on the first conditional probability data and the second conditional probability data, perform risk assessment by assigning one or more of the following: a first risk class to the user, a second risk class to the set of one or more software artifacts and a third risk class to the set of one or more reviewers.

21. The computer system of claim 15, wherein the instructions further cause the processor to:
in response to determination that the predicted software build outcome is successful, assign the user to perform the modification and the set of one or more reviewers to review the modification; and in response to determination that the predicted software build outcome is unsuccessful, select a different user or a different set of one or more reviewers, or both, for the set of one or more software artifacts to improve the predicted software build outcome.

* * * * *